United States Patent
Ho et al.

(10) Patent No.: US 11,580,391 B2
(45) Date of Patent: Feb. 14, 2023

(54) ATTACK-LESS ADVERSARIAL TRAINING FOR ROBUST ADVERSARIAL DEFENSE

(71) Applicant: Dongseo University Headquarters, Busan (KR)

(72) Inventors: Jiacang Ho, Busan (KR); Byung Gook Lee, Busan (KR); Dae-Ki Kang, Busan (KR)

(73) Assignee: Dongseo University Headquarters, Busan (KR)

( * ) Notice: Subject to any disclaimer, the term of this patent is extended or adjusted under 35 U.S.C. 154(b) by 414 days.

(21) Appl. No.: 16/783,736

(22) Filed: Feb. 6, 2020

(65) Prior Publication Data

US 2021/0192339 A1 Jun. 24, 2021

(30) Foreign Application Priority Data

Dec. 24, 2019 (KR) .......................... 10-2019-0174038

(51) Int. Cl.
*G06N 3/08* (2006.01)
*G06F 21/64* (2013.01)

(52) U.S. Cl.
CPC .............. *G06N 3/08* (2013.01); *G06F 21/64* (2013.01)

(58) Field of Classification Search
None
See application file for complete search history.

(56) References Cited

U.S. PATENT DOCUMENTS

| 2017/0200092 A1* | 7/2017 | Kisilev | G06K 9/6274 |
| 2021/0157911 A1* | 5/2021 | Yu | G06N 3/0454 |

OTHER PUBLICATIONS

Miyazato, Shuntaro, Xueting Wang, Toshihiko Yamasaki, and Kiyoharu Aizawa. "Reinforcing the robustness of a deep neural network to adversarial examples by using color quantization of training image data." In 2019 IEEE International Conference on Image Processing (ICIP), pp. 884-888. IEEE, 2019. (Year: 2019).*

(Continued)

*Primary Examiner* — Frank D Mills
(74) *Attorney, Agent, or Firm* — United One Law Group LLC; Kongsik Kim; Jhongwoo Peck

(57) ABSTRACT

Disclosed herein is attack-less adversarial training for robust adversarial defense. The attack-less adversarial training for robust adversarial defense includes the steps of: (a) generating individual intervals ($c_i$) by setting the range of color (C) and then discretizing the range of color (C) by a predetermined number (k); (b) generating one batch from an original image (X) and training a learning model with the batch; (c) predicting individual interval indices ($\hat{y}_i^{alat}$) from respective pixels ($x_i$) of the original image (X) by using an activation function; (d) generating a new image ($X^{alat}$) through mapping and randomization; and (e) training a convolutional neural network with the image ($X^{alat}$) generated in step (d) and outputting a predicted label ($\hat{Y}$).

5 Claims, 10 Drawing Sheets

(56) References Cited

OTHER PUBLICATIONS

Prakash, Aaditya, Nick Moran, Solomon Garber, Antonella DiLillo, and James Storer. "Deflecting Adversarial Attacks with Pixel Deflection." In 2018 IEEE/CVF Conference on Computer Vision and Pattern Recognition, pp. 8571-8580. IEEE, 2018. (Year: 2018).*

Chen, Jiefeng, Xi Wu, Vaibhav Rastogi, Yingyu Liang, and Somesh Jha. "Towards understanding limitations of pixel discretization against adversarial attacks." In 2019 IEEE European Symposium on Security and Privacy (EuroS&P), pp. 480-495. IEEE, 2019. (Year: 2019).*

Zhang, Yuchen, and Percy Liang. "Defending against whitebox adversarial attacks via randomized discretization." In the 22nd International Conference on Artificial Intelligence and Statistics, pp. 684-693. PMLR, 2019. (Year: 2019).*

* cited by examiner

ATTACK-LESS ADVERSARIAL TRAINING FOR ROBUST ADVERSARIAL DEFENSE

CROSS-REFERENCE TO RELATED APPLICATION

This application claims the benefit of Korean Patent Application No. 10-2019-0174038 filed on Dec. 24, 2019, which is herein incorporated by reference in its entirety.

BACKGROUND

1. Technical Field

The present invention relates generally to attack-less adversarial training that does not use an existing attack technique for robust adversarial defense, and more specifically to attack-less adversarial training that generates a new image from an original image through mapping and randomization and trains a neural network with the generated new image, thereby defending the neural network against attack techniques.

2. Description of the Related Art

Adversarial machine learning relates to attack techniques that focus on deceiving defense models with noise that is not perceivable by a human. An adversarial example is one of the examples that are generated in adversarial machine learning. An adversarial example may deceive an application by obstructing a task, such as the detection of an object, the classification of an image, the recognition of voice, or the like, in an application on a computer. For example, in a face recognition application, an attacker may deceive an application by proving that he or she is an authenticated user in such a way as to attach a sticker to his or her face. Furthermore, in an automobile image classification system, an attacker may deceive the automobile image classification system by causing a stop signal to be recognized as a forward movement signal in such a way as to add adversarial noise to the stop signal. As a result, such an attack may cause a serious disaster.

In an adversarial example for image classification, minimum adversarial noise may be generated and added to a legitimate image. The adversarial noise refers to the perturbation of pixels that are generated on an image. Accordingly, in the generation of an adversarial image, the smaller the number of pixels to be perturbed is, the more effective an attack technique is.

A defense technique refers to a method of generating a robust neural network capable of accurately detecting or correctly classifying adversarial examples and preventing adversarial attacks. Adversarial training is a defense technique that was first introduced by Ian Goodfellow et al. Adversarial training is designed to generate adversarial examples using attack techniques and to apply the adversarial examples to a neural network during a training phase. However, adversarial training is effective only for existing attack techniques and attack techniques similar to the existing attack techniques, and is vulnerable to new and state-of-the-art attack techniques. Furthermore, to generate an adversarial example for training, adversarial training requires at least one attack technique.

PRIOR ART DOCUMENTS

Patent Documents (Patent document 1) US20190220605 A1
(Patent document 2) WO2019143384 A1

SUMMARY

The present invention has been conceived to overcome the above-described problems, and an object of the present invention is to provide attack-less adversarial training for robust adversarial defense, which generates a new image from an original image through mapping and randomization and trains a neural network with the generated new image, thereby robustly defending the neural network against new and state-of-the-art attack techniques.

In order to accomplish the above object, the present invention provides attack-less adversarial training for robust adversarial defense, the attack-less adversarial training including the steps of: (a) generating individual intervals ($c_i$) by setting the range of color (C) and then discretizing the range of color (C) by a predetermined number (k); (b) generating one batch from an original image (X) and training a learning model with the batch; (c) predicting individual interval indices ($\hat{y}_i^{alat}$) from respective pixels ($x_i$) of the original image (X) by using an activation function; (d) generating a new image ($X^{alat}$) through mapping and randomization; and (e) training a convolutional neural network with the image ($X^{alat}$) generated in step (d) and outputting a predicted label ($\hat{Y}$).

Step (b) may include: (b-1) generating individual accurate interval indices ($y_i$) by randomly extracting a plurality of pixels ($x_i$) from the original image (X) and then allowing the extracted pixels ($x_i$) to the respective intervals ($c_i$) generated in step (a); (b-2) generating a plurality of instances each including each of the pixels ($x_i$) and a corresponding one of the accurate interval indices ($y_i$); (b-3) generating one batch including the plurality of instances generated in step (b-2); and (b-4) training a learning model with the batch generated in step (b-3).

Step (d) may include: (d-1) mapping the individual predicted interval indices ($\hat{y}_i^{alat}$) and returning corresponding intervals ($c_i$); (d-2) randomly generating individual new pixels ($x_i^{alat}$) within the range of the individual intervals ($c_i$) returned in step (d-1); and (d-3) generating a new image ($X^{alat}$) by allocating the individual new pixels ($x_i^{alat}$), generated in step (d-2), to the respective locations of the individual pixels ($x_i$) of the original image (X).

The activation function used in step (c) may be a softmax function.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Embodiments of the present invention will be described in detail below with reference to the accompanying drawings so that those having ordinary skill in the art to which the present invention pertains can easily practice the technical spirit of the present invention.

However, the following embodiments are merely examples intended to help an understanding of the present invention, and thus the scope of the present invention is not reduced or limited by the embodiments. Furthermore, the present invention may be embodied in many different forms, and are not limited to the embodiments set forth herein.

Attack-less adversarial training is a defense technique that generates a new image from an original image through mapping and randomization and trains a neural network with the generated new image, thereby robustly defending the neural network against state-of-the-art attack techniques.

Embodiment 1: Main Steps of Attack-Less Adversarial Training

Hereinafter, attack-less adversarial training according to the present invention will be referred to as "ALAT."

The main steps of ALAT will be described below.

Figure 1:
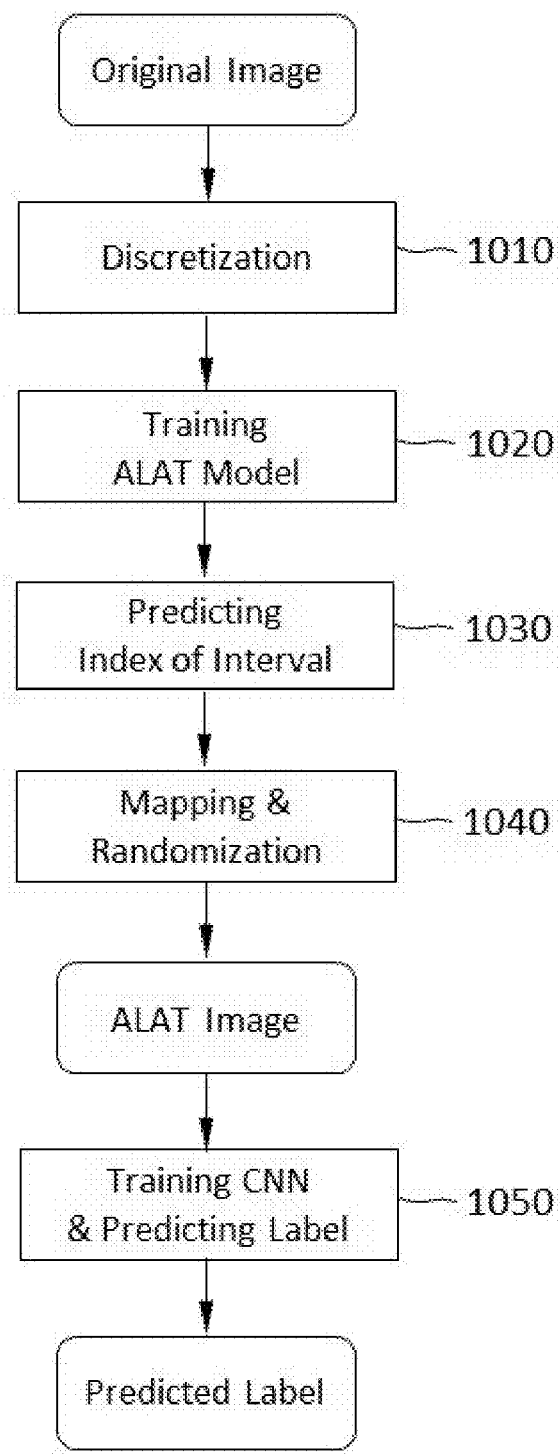
FIG. 1 is a flow chart illustrating the concept of ALAT.

FIG. 1 is a flow chart illustrating the concept of ALAT.

Referring to FIG. 1, a first step is step 1010 of generating intervals $c_i$ by setting the range of color C and then discretizing the range of color C by a predetermined number.

When the range of color C is discretized into k intervals, a resulting set of intervals is $\{c_i | c_i \subset C\}$, where $c_i = c_1, c_2, \ldots, c_k$. In this case, the minimum value of intervals $c_i$ is $s_{i_{min}}^{alat}$, and the maximum value thereof is $s_{i_{max}}^{alat}$.

For example, when color C=[0,255], color C is discretized into five intervals and each of the intervals is equally divided at [0,255], $c_1 = [s_{1_{min}}^{alat}, s_{1_{max}}^{alat}] = [0,51]$, $c_2 = [s_{2_{min}}^{alat}, s_{2_{max}}^{alat}] = [52,102]$, $c_3 = [s_{3_{min}}^{alat}, s_{3_{max}}^{alat}] = [103,153]$, $c_4 = [s_{4_{min}}^{alat}, s_{4_{max}}^{alat}] = [154,204]$, and $c_5 = [s_{5_{min}}^{alat}, s_{5_{max}}^{alat}] = [205,255]$ are obtained.

A second step is step 1020 of generating one batch from an original image X and then training a learning model.

First, a plurality of pixels $x_i$ is randomly extracted from the original image X, and individual accurate interval indices $y_i$ are generated by mapping the extracted individual pixels $x_i$ to the respective generated intervals $c_i$ generated in the above-described first step.

Furthermore, a plurality of instances is each generated by including each pixel $x_i$ and an accurate interval index $y_i$ corresponding to the pixel $x_i$. In this case, the generated instance may be represented as $(x_i, y_i)$, where $x_i$ is a randomly extracted pixel and $y_i$ is an accurate interval index corresponding to the randomly extracted pixel.

Furthermore, there is generated one batch including the plurality of generated instances.

Finally, the learning model is trained by inputting the generated one batch to the learning model.

For example, when the randomly extracted pixel $x_1$ is 38 in the pervious example, an accurate interval index $y_i$ corresponding to the randomly extracted pixel x is 1. The reason for this is that 38 is a number in the range of 0 to 51. In other words, the reason why the accurate interval index $y_i$ is 1 is that 38 is a number that belongs to the intervals $c_1 = [0,51]$.

In this case, the generated instance is (38,1). Furthermore, the instances (113,3), (204,4), and (3,1) may be generated in the same manner. Furthermore, there is generated one batch including a plurality of generated instances (38,1), (113,3), (204,4), and (3,1). Finally, a learning model may be trained by inputting the generated batch to the learning model.

Hereinafter, the learning model trained in the second step of the embodiment 1 of the present invention will be referred to as the "ALAT model."

A third step is step 1030 of outputting each interval index $\hat{y}_i^{alat}$ predicted from each pixel $x_i$ of the original image X by using an activation function.

The equation for predicting the interval index is as follows:

$$\hat{y}_i^{alat} = a(wx_i + b)$$

where $\hat{y}_i^{alat}$ is a predicted interval index, w is a weight, $x_i$ is a pixel of an original image, b is a bias, and a(•) is a softmax function, which is an activation function.

In this case, an accurate interval index is represented by $y_i$, and a predicted interval index is represented by $\hat{y}_i^{alat}$. These symbols are distinctively used because a predicted interval index is not an accurate interval index value but an interval index value that can be predicted by a trained ALAT model.

A fourth step is step 1040 of generating a new image $X^{alat}$ through mapping and randomization.

First, each predicted interval index $\hat{y}_i^{alat}$ is mapped, and each interval $c_i$ corresponding to each predicted interval index $\hat{y}_i^{alat}$ returned. A function that returns the interval $c_i$ is as follows:

$$c_i = \text{colorset}(\hat{y}_i^{alat})$$

where colorset(•) is a function that returns each interval $c_i$ from the predicted interval index $\hat{y}_i^{alat}$.

Furthermore, each new pixel $x_i^{alat}$ is randomly generated within the range of the individual mapped intervals $c_i$.

A function that generates the new pixel $x_i^{alat}$ is defined as follows:

$$x_i^{alat} = \text{random}_{ci}(s_{i_{min}}^{alat}, s_{i_{max}}^{alat})$$

where $\text{random}_{ci}$ is a random function that generates a random value within the range of the minimum value $s_{i_{min}}^{alat}$ of $c_i$ to the maximum value $s_{i_{max}}^{alat}$ of $c_i$.

Finally, an ALAT image $X^{alat}$ is generated by allocating each new pixel $x_i^{alat}$ to the location of each pixel $x_i$ of the original image X.

For example, in the pervious example, when a pixel $x_2$ of the original image is 75, the interval index $\hat{y}_2^{alat}$ predicted by the ALAT model may be 2. Furthermore, the predicted interval index $\hat{y}_2^{alat} = 2$ is mapped by a colorset function, and the interval $c_2 = [52,102]$ is returned. Furthermore, the new pixel $x_2^{alat} = 85$ may be randomly generated within the range of the minimum value 52 of the mapped interval $c_2$ to the maximum value 102 of $c_2$. Finally, a new image $X^{alat}$ may be generated by allocating the new pixel $x_2^{alat}$ to the location of the pixel $x_2$ of the original image X and performing the same on the remaining pixels of the original image in the same manner. In this case, the image $X^{alat}$ newly generated from the original image is referred to as the "ALAT image." Furthermore, a method that is applied to the first to fourth steps of embodiment 1 of the present invention is referred to as an ALAT method below.

A fifth step is step 1050 of training a convolutional neural network (CNN) with the ALAT image $X^{alat}$ generated in the above-described fourth step and outputting a predicted label $\hat{Y}$.

An equation that trains the convolutional neural network with the ALAT image $X^{alat}$ is as follows:

$$\hat{Y}=F(X^{alat})$$

where the function $F(\bullet)$ is a function that generates the predicted label $\hat{Y}$ for one image.

Figure 2:
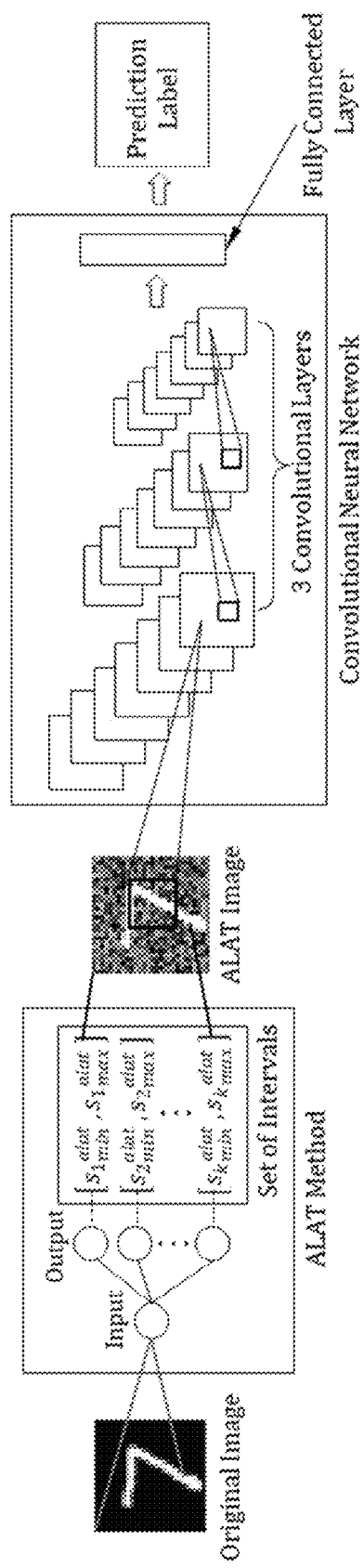
FIG. 2 is a block diagram illustrating the concept of ALAT.

FIG. 2 is a block diagram illustrating the concept of ALAT.

Referring to FIG. 2, the convolutional neural network includes three convolutional layers and one fully connected layer.

Referring to FIG. 2, there can be seen the process of generating the ALAT image by reproducing each pixel of the original image using an ALAT method and generating a predicted label by inputting the generated ALAT image to the convolutional neural network.

Figure 3:
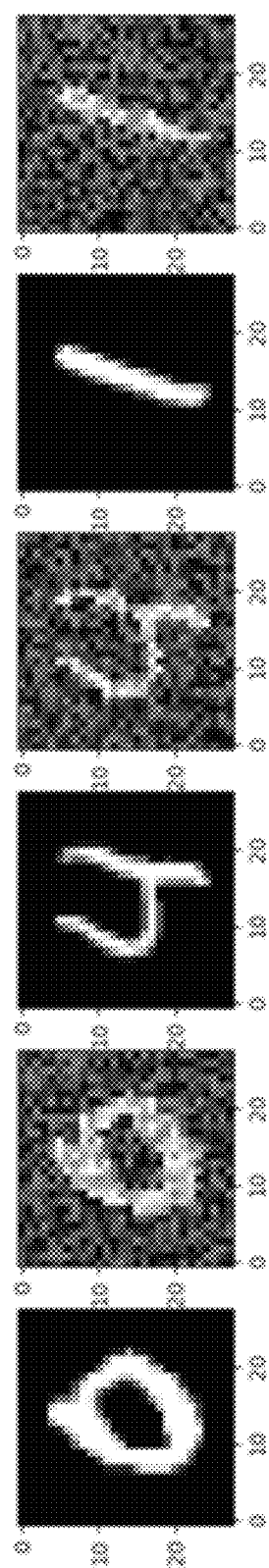
FIG. 3 is a view showing comparisons between original images and ALAT images.

FIG. 3 is a view showing comparisons between original images and ALAT images. Referring to FIG. 3, three pairs of images can be seen. In each pair of images, the left image is an original image, and the right image is an ALAT image. In embodiment 1, ALAT images generated from original images may be represented as shown in FIG. 3.

Experimental Example 1: Comparisons in the Performance of the ALAT Method Applied to Different Attack Scenarios First, symbols mainly used in experimental example 1 are as follows.

$\hat{X}$ is an adversarial image of the original image X. $\hat{Y}$ is a predicted label that may be output by inputting one image to a convolutional neural network (CNN).

Furthermore, the function $F(\bullet)$ is a function that generates a predicted label f for an image. Furthermore, the attack technique $A(\bullet)$ is a function that generates the adversarial image $\hat{X}$ from the original image X with or without the function $F(\bullet)$. Furthermore, $D(X_1, X_2)$ is the distance between two images $X_1$ and $X_2$.

Attack techniques that were applied to experimental example 1 of the present invention include the Fast Gradient Sign Method (FGSM), the Basic Iterative Method (BIM), the Momentum Iterative Method (MIM), the L2-Carlini & Wagner's Attack (L2-CW), the Backward Pass Differentiable Approximation (BPDA), and the Expectation Over Transformation (EOT).

First, FGSM (the Fast Gradient Sign Method) is a fast and simple attack technique that was proposed by Goodfellow et al. and generates an adversarial example.

BIM (The Basic Iterative Method) is an extension of the FGSM that was proposed by Kurakin et al. and applies multiple iterations with a small step size in order to obtain the smallest perturbation of an original image.

MIM (the Momentum Iterative Method) is an attack technique that was proposed by Dong et al. and is more advanced than BIM because it is equipped with a momentum algorithm.

L2-CW is an attack technique that is effective in finding an adversarial example with the smallest perturbation.

BPDA (Backward Pass Differentiable Approximation) is an attack technique that replaces a non-differentiable layer in a neural network with a differentiable approximation function during the back-propagation step.

EOT (Expectation Over Transformation) is an attack technique that allows for the generation of adversarial examples that remain adversarial over a chosen distribution T of transformation functions taking an input.

Furthermore, in experimental example 1 of the present invention, there were used Modified National Institute of Standards and Technology (MNIST), Fashion MNIST, and Canadian Institute For Advanced Research (CIFAR-10).

For the CIFAR-10 dataset, another CIFAR-10 (grayscale) was generated in order to analyze the effect of the ALAT method on a color image.

MNIST and fashion MNIST had 60,000 training images and 10,000 test images associated with 10 grade labels. The size of each image was 28×28 grayscales. CIFAR-10 had 50,000 training images and 10,000 test images associated with 10 grades. The size of each image was 32×32 color.

In experimental example 1 of the present invention, when FGSM, BIM and MIM attacks were applied, $\in=77/255$, which was the largest perturbation allowed for each pixel, was set for a MNIST dataset and $\in=8/255$ was set for Fashion MNIST and CIFAR-10 datasets.

Furthermore, for an L2-CW attack, the number of iterations for the execution of an attack was set to 1,000.

In the present invention, the ALAT method may be evaluated based on individual cases having different attack scenarios. In this case, the individual cases are a normal case, case A, case B, case C, and case D.

The process of generating the ALAT image $X^{alat}$ by applying the ALAT method to the original image X may be expressed by the following equation:

$$X^{alat}=F^{alat}(X)$$

In the normal case, a convolutional neural network is evaluated using the ALAT method in the testing phase. The normal case is a case where an attack is not applied, in which case a convolutional neural network may be tested using an original image. A defense mechanism generates the ALAT image by applying the ALAT method to the original image.

$$X^{alat}=F^{alat}(X)$$

Furthermore, the defense mechanism applies the ALAT image to the trained convolutional neural network.

$$\hat{Y}=F(X^{alat})=(F^{alat}(X))$$

In case A, the convolutional neural network is evaluated using the ALAT method in the testing phase. An attacker knows the parameters of the trained convolutional neural network, but does not know about the ALAT method. The attacker generates an adversarial image from the original image by using the parameters of the trained convolutional neural network.

$$\hat{X}=A(F,X)$$

The defense mechanism generates the ALAT image by applying the ALAT method to the received adversarial image.

$$\hat{X}^{alat}=F^{alat}(\hat{X})$$

Furthermore, the defense mechanism applies the ALAT image to the trained convolutional neural network.

$$\hat{Y}=F(\hat{X}^{alat})=F(F^{alat}(\hat{X}))=F(F^{alat}(A(F,X)))$$

In case B, the convolutional neural network is evaluated without the ALAT method in the testing phase. An attacker knows the parameters of the trained convolutional neural network, but does not know about the ALAT method. The attacker generates an adversarial image from an image by using the parameters of the trained convolutional neural network.

$$\hat{X}=A(F,X)$$

The trained convolutional neural network uses the adversarial image as an input without undergoing a preprocessing process by the ALAT method.

$$\hat{Y}=F(\hat{X})=F(A(F,X))$$

In case C, the convolutional neural network is evaluated without the ALAT method in the testing phase. An attacker knows both the parameters of the trained convolutional neural network and the parameters of the ALAT model. The attacker generates an adversarial image from the original image by using the parameters of the trained convolutional neural network and the parameters of the ALAT model.

$$\hat{X}=A(F,F^{alat},X)$$

The trained convolutional neural network uses the adversarial image as an input without undergoing a preprocessing process by the ALAT method.

$$\hat{Y}=F(\hat{X})=F(A(F,F^{alat},X))$$

In case D, the convolutional neural network is evaluated using the ALAT method in the testing phase. An attacker knows both the parameters of the trained convolutional neural network and the parameters of the ALAT model. The attacker generates an adversarial image from the original image by using the parameters of the trained convolutional neural network and the parameters of the ALAT model.

$$\hat{X}=A(F,F^{alat},X)$$

The defense mechanism generates the ALAT image by applying the ALAT method to the received adversarial image.

$$\hat{X}^{alat}=F^{alat}(\hat{X})$$

Furthermore, the defense mechanism applies the newly generated ALAT image to the trained convolutional neural network.

$$\hat{Y}=F(\hat{X}^{alat})=F(F^{alat}(\hat{X}))=F(F^{alat}(A(F,F^{alat},X)))$$

Figure 4:
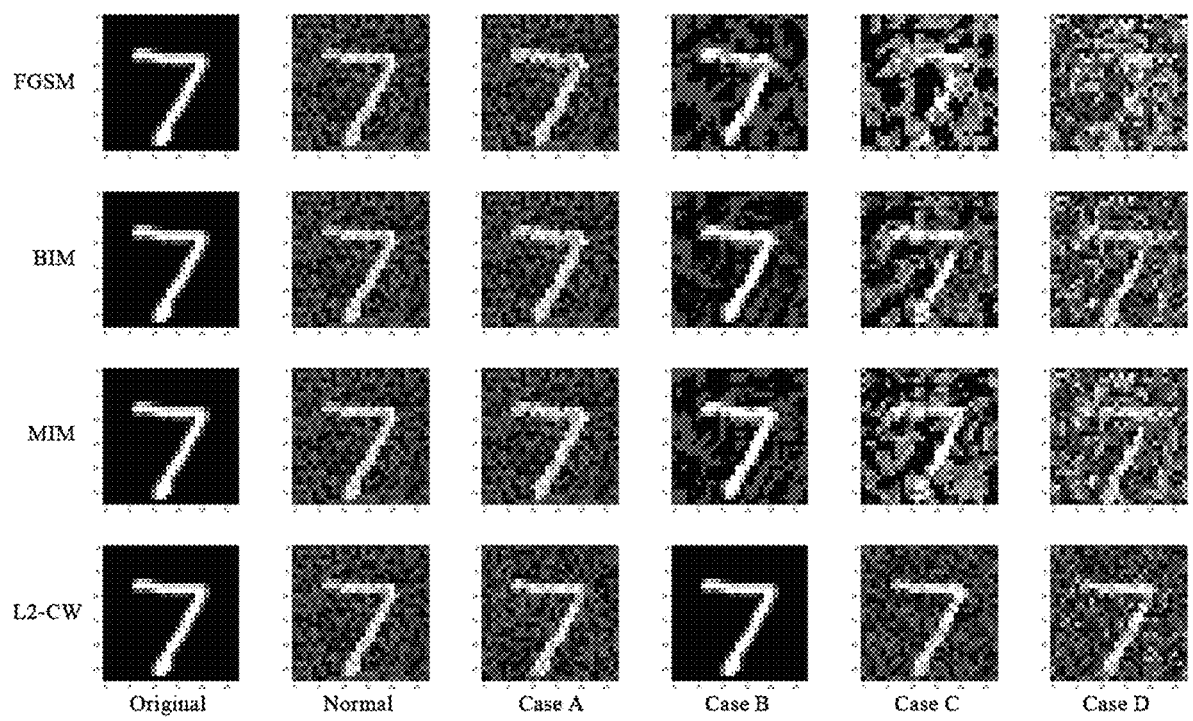
FIG. 4 is a view showing comparisons between images perturbed by FGSM, BIM, MIM and L2-CW attack techniques from an MNIST dataset for individual cases.

FIG. 4 is a view showing comparisons between images perturbed by FGSM, BIM, MIM and L2-CW attack techniques from an MNIST dataset for the individual cases.

Referring to FIG. 4, the first column of FIG. 4 shows original images. The second column of FIG. 4 shows ALAT images generated from the original images in the normal case. The case A and case D columns of FIG. 4 show ALAT images generated from adversarial images generated by the FGSM, BIM, MIM and L2-CW attack techniques. The case B and case C columns of FIG. 4 show the adversarial images generated by the FGSM, BIM, MIM and L2-CW attacks.

Meanwhile, the adversarial images generated from cases C and D have a large perturbation because it is difficult for an attacker to calculate the derivative of a randomization method used in the ALAT method. In order to mitigate the differential calculation problem of the randomization method and to minimize the high distortion of the adversarial image generated in case D, each attack technique is integrated with the BPDA method or the EOT method.

If the defense system generates an obfuscated gradient, the attack technique cannot obtain appropriate gradient information to generate adversarial examples. Furthermore, when the BPDA method or EOT method is integrated with each attack technique, the conventional defense system is known to be unable to fully defend against the adversarial examples due to the obfuscated gradient.

To evaluate whether or not the ALAT method generates the obfuscated gradient, each attack technique is integrated with the BPDA method or EOT method.

Assuming that the ALAT image $X^{alat}$ is generated by adding some noise to the original image X, an equation for obtaining $X^{alat}$ is as follows:

$$X^{alat}\approx X+\gamma^{alat}$$

In this case, $\gamma^{alat}$ is a noise matrix.

In this case, a predicted label may be calculated as follows:

$$\hat{Y}=F(X^{alat})\approx W(X+\gamma^{alat})+B$$

$$\hat{Y}\approx WX^{alat}+B$$

In this case, W is a weight matrix, and B is a bias matrix.

In the above equation, it can be seen that the derivation of $\hat{Y}$ in terms of $X^{alat}$ returns only W. From this, it can be seen that the adversarial examples generated in the attack scenarios of cases C and D have a larger perturbation than the adversarial examples generated from the attack scenarios of cases A and B.

To minimize perturbation in the attack scenarios of cases C and D, adversarial examples are generated using BPDA for the attack scenarios of cases C and D.

First, a preprocessing method of converting the original image into the ALAT image is executed. After the ALAT image has been input to the convolutional neural network, a predicted value and loss value of the convolutional neural network are obtained. Thereafter, during back propagation, the adversarial ALAT image $\hat{X}^{alat}$ is generated by adding the ALAT image $X^{alat}$ to a loss function value for $X^{alat}$.

$$\hat{X}^{alat}=X^{alat}+\in\cdot\nabla_{X^{alat}}L(X^{alat},y)$$

where $\in$ is the largest perturbation allowed for each pixel and L is the loss function.

Finally, noise $\gamma^{alat}$ is subtracted from adversarial ALAT image $\hat{X}^{alat}$.

The general equation of BPDA used in experimental example 1 is as follows:

$$\hat{X}=\text{Clip}_X(A(F,X^{alat})-(X^{alat}-X))$$

$$\hat{X}=\text{Clip}_X(\hat{X}^{alat}-\gamma^{alat})$$

where A(•) is an attack technique.

To evaluate the EOT method, a final ALAT image is generated by generating 10 ALAT images and calculating the average of the images.

$$X_{final}^{alat}=E(X_{f1..10}^{alat})$$

An adversarial image is generated using the final ALAT image.

Figure 5:
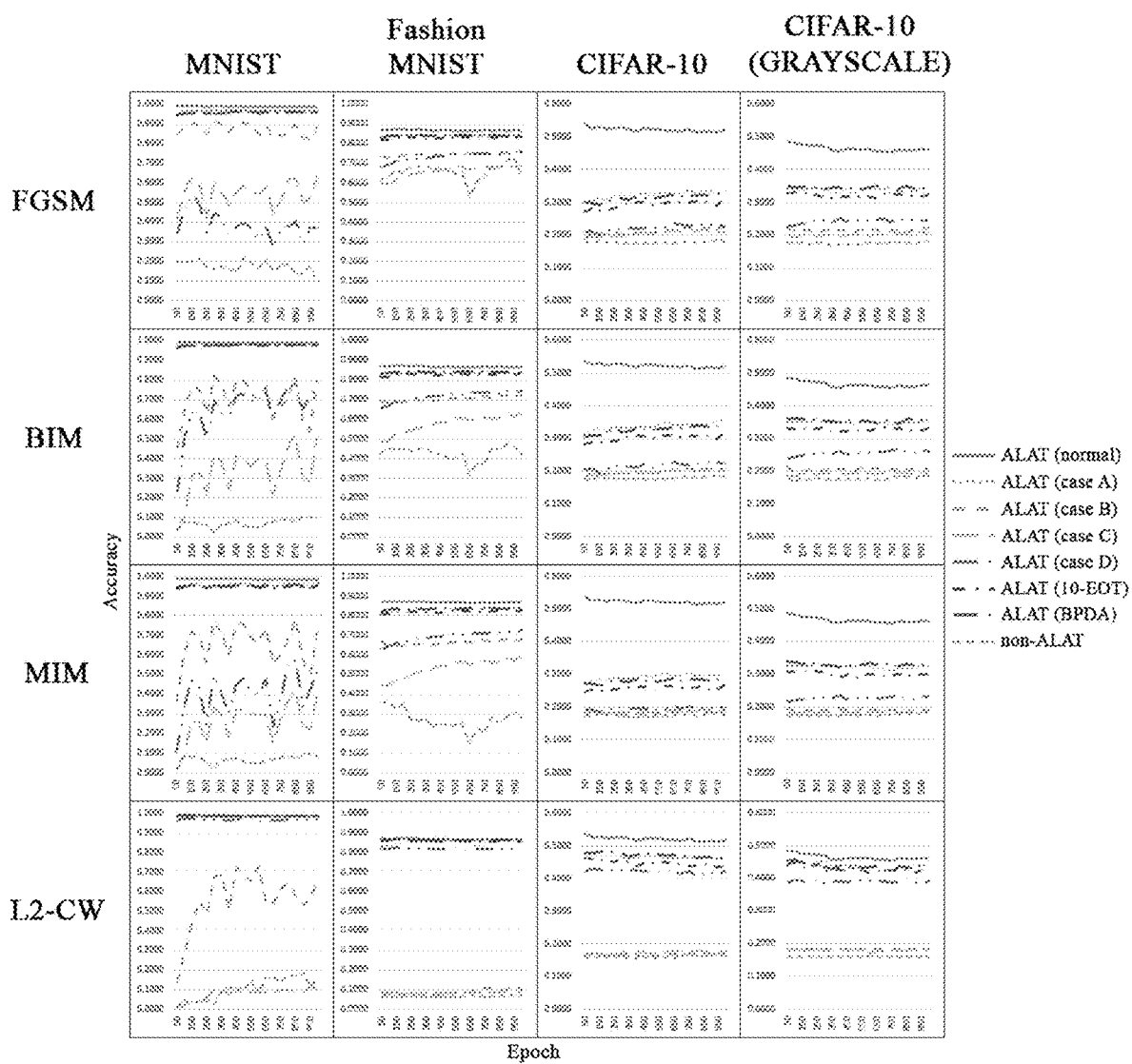
FIG. 5 shows comparisons in the performance of the ALAT method applied to different attack scenarios in terms of accuracy.

FIG. 5 shows comparisons in the performance of the ALAT method applied to different attack scenarios in terms of accuracy.

Referring to FIG. 5, it can be seen that the ALAT method exhibited better performance than a non-ALAT method. This means that a convolutional neural network trained with the ALAT method was more robust than a convolutional neural network trained without the ALAT method. Furthermore, it can be seen that the performance of the convolutional neural network was robust even in case B to which MNIST and Fashion MNIST datasets were applied. Furthermore, it can be seen that the convolutional neural network having used the ALAT method in cases A and D exhibited better performance than the convolutional neural network having used the ALAT method in cases B and C.

Referring to FIG. 5, although the performance of the convolutional neural network was slightly degraded in the ALAT method in which BPDA and EOT were integrated with different attack techniques, the accuracy of ALAT (BPDA) and ALAT (10-EOT) was similar to that of ALAT (case A). Accordingly, it can be seen that ALAT effectively defends against methods specialized to attack obfuscated gradients like BPDA and EOT.

Figure 6:
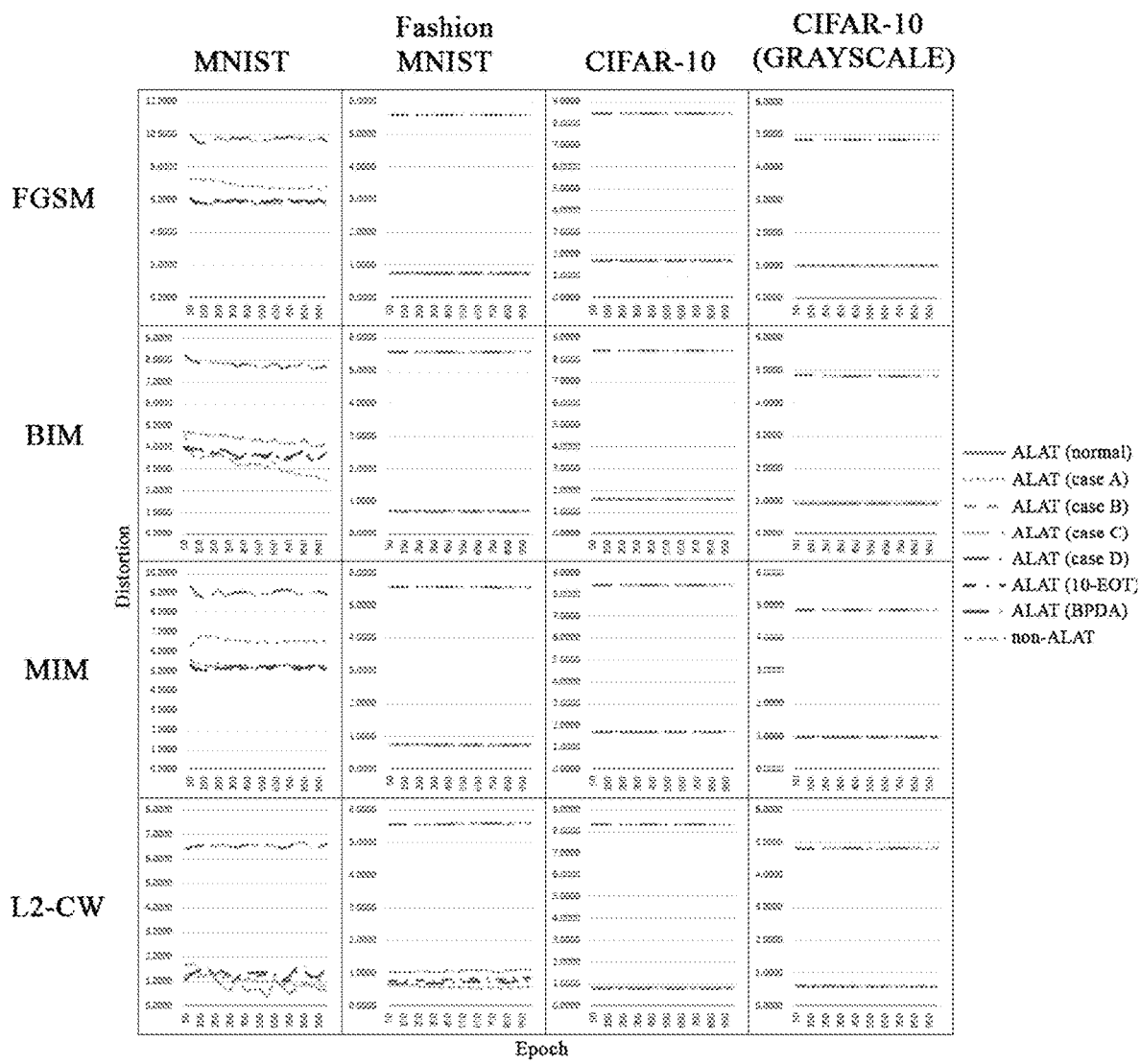
FIG. 6 shows comparisons in the performance of the ALAT method applied to different attack scenarios in terms of distortion.

FIG. 6 shows comparisons in the performance of the ALAT method applied to different attack scenarios in terms of distortion.

Referring to FIG. 6, the ALAT method exhibited better performance in a grayscale dataset than in a color dataset. This can be seen by comparing CIFAR-10 and CIFAR-10 (grayscale) datasets. As can be seen from ALAT (BPDA) and ALAT (10-EOT) of FIG. 6, the perturbation of the generated adversarial image was considerably reduced in the ALAT method in which BPDA and EOT were integrated with the different attack techniques.

Meanwhile, the reason for this is that in order to prevent a human from recognizing perturbation in an adversarial example, the perturbation between the original image and the adversarial image needs to be as low as possible.

Experimental Example 2: Comparisons in Performance Between a Case Using a Single ALAT Model and a Case Using a Plurality of ALAT Models In experimental example 2, the same benchmark datasets and attack techniques used in experimental example 1 are also applied.

A plurality of ALAT models is trained, and each pixel of an original image may be predicted using one of the plurality of trained ALAT models. In other words, to predict the pixel of the original image, one ALAT model may be randomly selected from among the plurality of ALAT models. Thereafter, the step of randomly selecting one ALAT model from among the plurality of ALAT models is repeated until all the pixels are reproduced.

As described above, in experimental example 1, cases C and D are not practical, and are thus excluded from the experiment.

Figure 7:
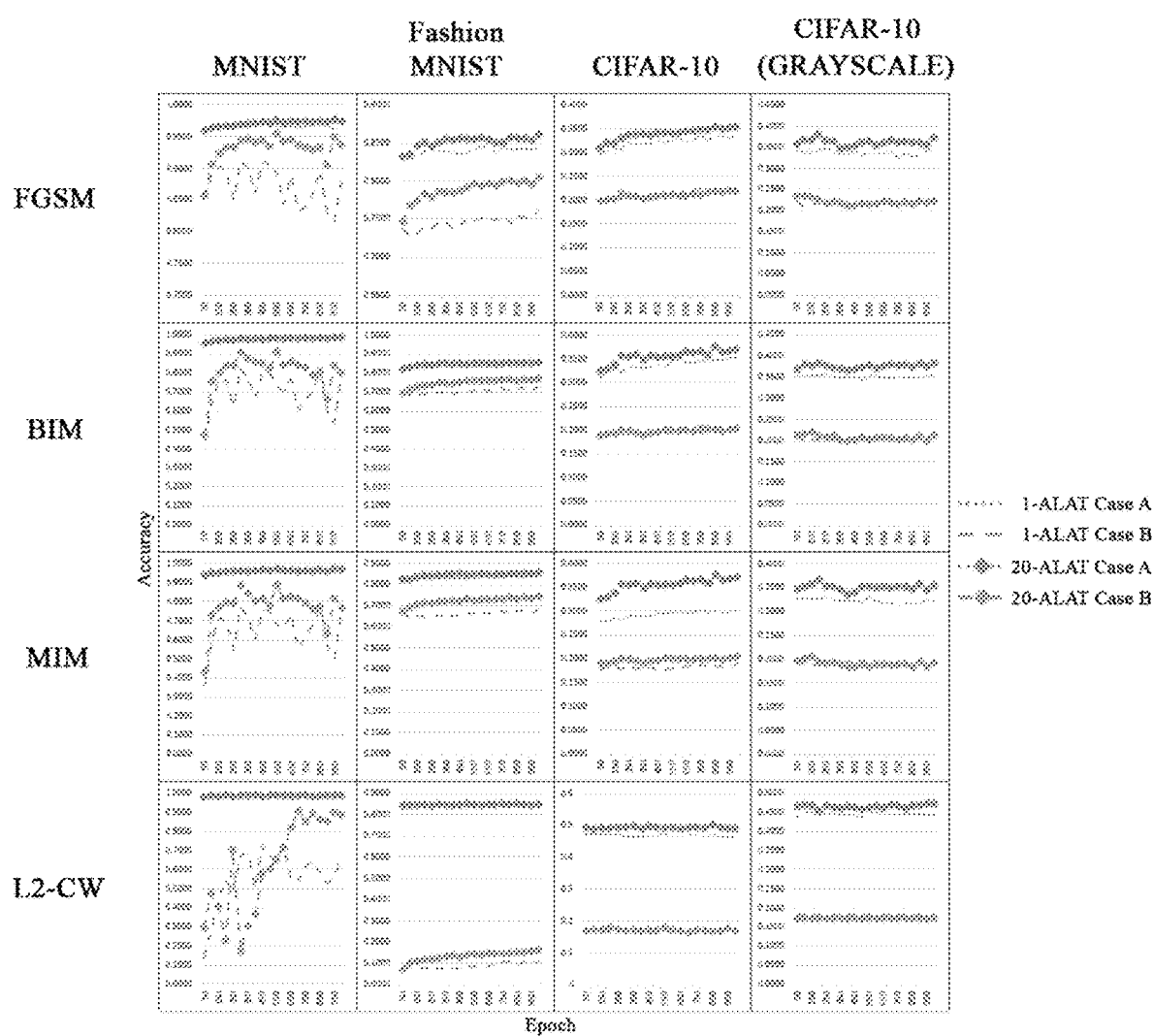
FIG. 7 shows comparisons in accuracy between a case using one ALAT model and a case using 20 ALAT models.

FIG. 7 shows comparisons in accuracy between a case using one ALAT model and a case using 20 ALAT models. Referring to FIG. 7, it can be seen that the case using 20 ALAT models exhibited better performance than the case using one ALAT model.

Experimental Example 3: Comparisons in Performance Between the ALAT Method and the Random Noise Injection (RNI) Method In experimental example 3, the same benchmark datasets and attack techniques used in experimental example 1 are also applied.

The RNI method is applied to three different steps including (1) the training phase, (2) the testing phase, and (3) both the training and testing phases.

In the RNI method, a uniform distribution is used, and a distribution range extends from −1.0 to +1.0.

A noise value generated from a uniform distribution is added to an original image. Furthermore, the summed output is clipped into a range of 0.0 to 1.0 (a normalized pixel value).

The equation of RNI may be expressed as follows:

$$X_i^{RNI} = \mathrm{Clip}(X_i + U(-1, +1))$$

where $X_i$ is the original image and $X_i^{RNI}$ is an image generated from the RNI method. Furthermore, $U(-1, +1)$ is a uniform distribution ranging from −1 to +1.

Figure 8:
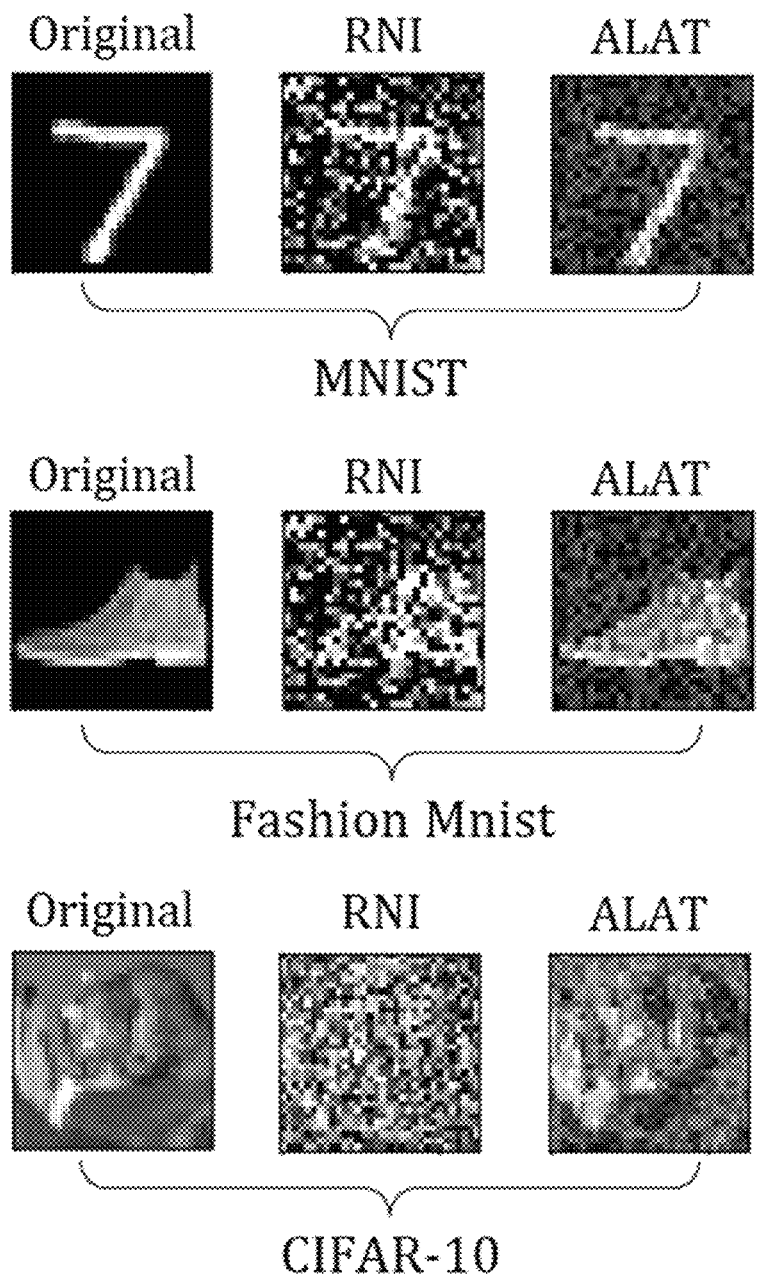
FIG. 8 is a view showing comparisons among original images, RNI images, and ALAT images.

FIG. 8 is a view showing comparisons among original images, RNI images, and ALAT images.

Referring to FIG. 8, in each dataset, the left image is an original image, the center image is an RNI image, and the right image is an ALAT image. From FIG. 8, it can be seen that the ALAT method may generate an image recognizable by a human, unlike the RNI method.

Figure 9:
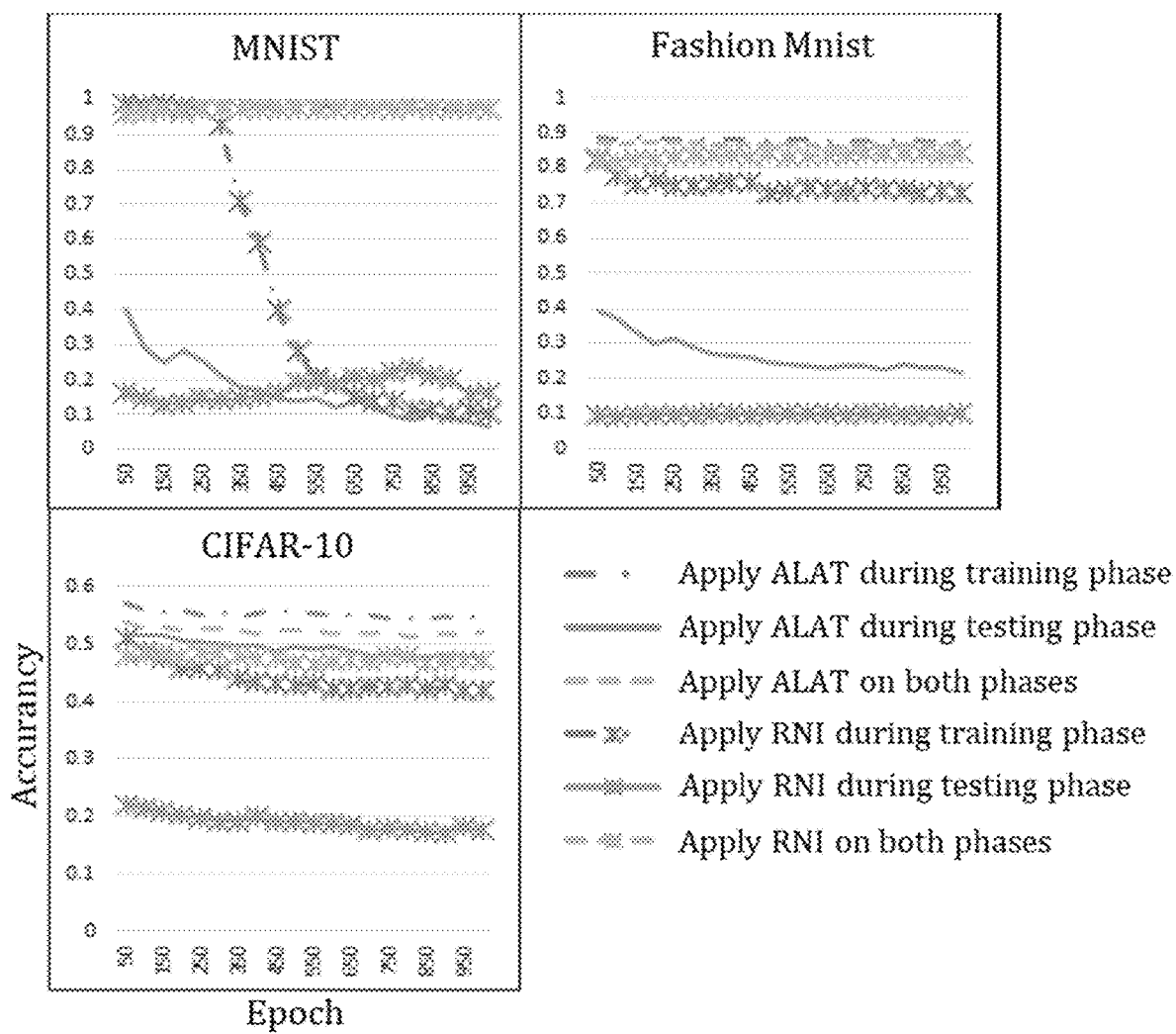
FIG. 9 shows comparisons between an ALAT method and an RNI method.

FIG. 9 shows comparisons between the ALAT method and the RNI method.

Referring to FIG. 9, it can be seen that the ALT method exhibited better performance than the RNI method in the training phase and both the stages. Furthermore, as the number of epochs increased, the ALAT method exhibited increasingly better performance than the RNI method in terms of accuracy.

Referring to FIG. 9, the RNI image had a larger perturbation than the ALAT image. Accordingly, when an image is generated using the RNI method, it is difficult for the convolutional neural network to classify the image correctly.

Experimental Example 4: Comparisons in Performance Between the ALAT Method and the Adversarial Training Method In experimental example 4, the same benchmark datasets and attack techniques used in experimental example 1 are also applied.

Adversarial training is related to attack techniques in the training phase. When a low-level attack technique such as an FGSM attack is used in adversarial training, the low-level attack technique provides lower performance than a high-level attack technique such as a BIM or MIM attack. For a realistic experiment, an MIM attack may be set as the attack technique that is used for adversarial training.

Figure 10:
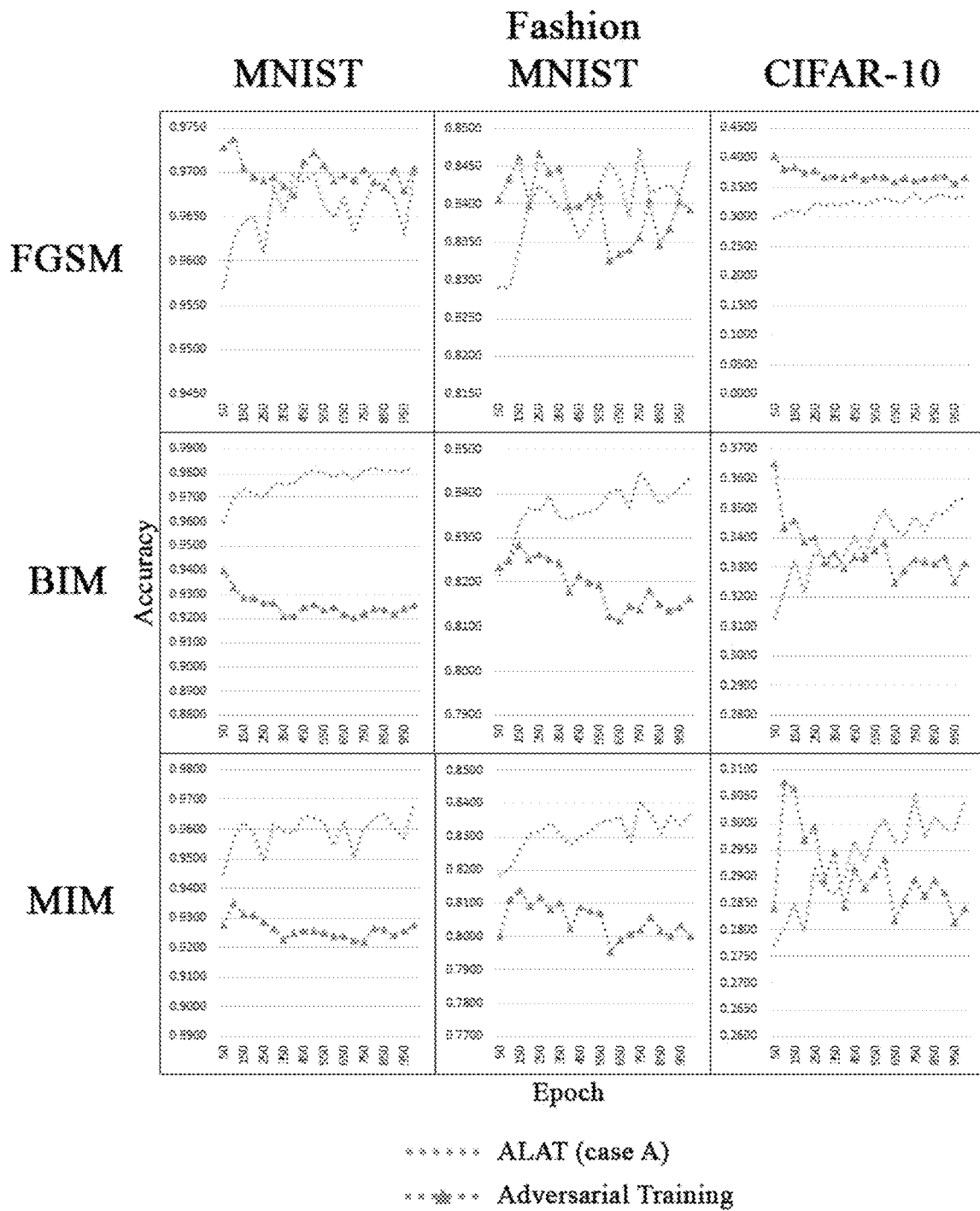
FIG. 10 shows comparisons between the ALAT method and an adversarial training method.

FIG. 10 shows comparisons between the ALAT method and the adversarial training method.

Referring to FIG. 10, it can be seen that in most cases, the ALAT method offers better performance than the adversarial training method.

Experimental Example 5: Performance of the ALAT Method According to the Number of Intervals k In experimental example 5, the same benchmark datasets and attack techniques used in experimental example 1 are also applied.

In experimental example 5, the effect of the number of intervals k on the convolutional neural network is analyzed. In experimental example 5, k=3, k=4 and k=10 are set.

As described above in conjunction with experimental example 1, cases C and D are not practical, and are thus excluded from the experiment.

Table 1 shows comparisons in the performance of the ALAT method among a normal case, case A, and case B to which different numbers (k) of intervals were applied at their 1000th epoch.

Referring to Table 1, the performance of the ALAT method in which k=3 was best. In other words, in the case of the ALAT method in which k=3, winning nodes are 19 in number. In contrast, in the case of the ALAT method in which k=4, winning nodes are 15 in number, and in the case of the ALAT method in which k=10, winning nodes are 2 in number.

When an appropriate k is used in the ALAT method, the robustness of the convolutional neural network is improved.

TABLE 1

| Dataset | Attack | Accuracy | | | | | | | | |
|---|---|---|---|---|---|---|---|---|---|---|
| | | Normal | | | Case A | | | Case B | | |
| | | k = 3 | k = 4 | k = 10 | k = 3 | k = 4 | k = 10 | k = 3 | k = 4 | k = 10 |
| MNIST | FGSM, $\epsilon$ = 0.300 | 0.9871 | 0.9796 | 0.9609 | 0.9699 | 0.8151 | 0.8209 | 0.8787 | 0.8409 | 0.7500 |
| | BIM, $\epsilon$ = 0.300 | | | | 0.9829 | 0.9306 | 0.8572 | 0.7930 | 0.6446 | 0.5935 |
| | MIM, $\epsilon$ = 0.300 | | | | 0.9686 | 0.7000 | 0.5913 | 0.7504 | 0.5380 | 0.4350 |
| | $L_2$-CW | | | | 0.9853 | 0.9902 | 0.9877 | 0.6624 | 0.8423 | 0.4854 |
| Fashion MNIST | FGSM $\epsilon$ = 0.031 | 0.8663 | 0.8941 | 0.8892 | 0.8459 | 0.8494 | 0.8250 | 0.7642 | 0.8212 | 0.8029 |
| | BIM, $\epsilon$ = 0.031 | | | | 0.8435 | 0.8460 | 0.8271 | 0.7271 | 0.7913 | 0.7712 |
| | MIM, $\epsilon$ = 0.031 | | | | 0.8367 | 0.8427 | 0.8157 | 0.6815 | 0.7622 | 0.7241 |
| | $L_2$-CW | | | | 0.8450 | 0.8500 | 0.8283 | 0.1048 | 0.1590 | 0.1532 |
| CIFAR-10 | FGSM, $\epsilon$ = 0.031 | 0.5201 | 0.5764 | 0.5918 | 0.3344 | 0.2868 | 0.2026 | 0.2265 | 0.2254 | 0.1906 |
| | BIM, $\epsilon$ = 0.031 | | | | 0.3534 | 0.2872 | 0.1972 | 0.2104 | 0.2072 | 0.1868 |
| | MIM, $\epsilon$ = 0.031 | | | | 0.3040 | 0.2349 | 0.1812 | 0.1905 | 0.1851 | 0.1781 |
| | $L_2$-CW | | | | 0.4667 | 0.4668 | 0.3884 | 0.1728 | 0.1742 | 0.1665 |
| CIFAR-10 (grayscale) | FGSM, $\epsilon$ = 0.031 | 0.4569 | 0.5210 | 0.5545 | 0.3371 | 0.3676 | 0.2126 | 0.2217 | 0.2079 | 0.1949 |
| | BIM, $\epsilon$ = 0.031 | | | | 0.3451 | 0.3191 | 0.2083 | 0.2079 | 0.2079 | 0.1869 |
| | MIM, $\epsilon$ = 0.031 | | | | 0.3158 | 0.2719 | 0.1841 | 0.1888 | 0.1903 | 0.1757 |
| | $L_2$-CW | | | | 0.4290 | 0.4630 | 0.4154 | 0.1845 | 0.1763 | 0.1656 |

The attack-less adversarial training for robust adversarial defense according to the present invention, which is configured as described above, provides the effects of improving the robustness of a neural network and not generating an obfuscated gradient.

Furthermore, the attack-less adversarial training for robust adversarial defense according to the present invention offers better performance than the random noise injection method and the adversarial training method.

Moreover, the attack-less adversarial training for robust adversarial defense according to the present invention does not require any attack technique unlike the conventional adversarial training and defending against new and state-of-the-art attack techniques.

Although the specific embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A method of attack-less adversarial training for robust adversarial defense, comprising the steps of:
   (a) generating individual intervals ($c_i$) by setting a range of color (C) and then discretizing the range of color (C) by a predetermined number (k);
   (b) generating one batch from an original image (X) and training a learning model with the batch;
   (c) predicting individual interval indices ($\hat{y}_i^{alat}$) from respective pixels ($x_i$) of the original image (X) by using an activation function;
   (d) generating a new image ($X^{alat}$) through mapping and randomization; and
   (e) training a convolutional neural network with the image ($X^{alat}$) generated in step (d) and outputting a predicted label (Y), wherein the step (b) comprises:
   (b-1) generating individual accurate interval indices ($y_i$) by randomly extracting a plurality of pixels ($x_i$) from the original image (X) and then allowing the extracted pixels ($x_i$) to the respective intervals ($c_i$) generated in step (a);
   (b-2) generating a plurality of instances each including each of the pixels ($x_i$) and a corresponding one of the accurate interval indices ($y_i$);
   (b-3) generating one batch including the plurality of instances generated in step (b-2); and
   (b-4) training a learning model with the batch generated in step (b-3).

2. The method of claim 1, wherein the step (d) comprises:
   (d-1) mapping the individual predicted interval indices ($\hat{y}_i^{alat}$) and returning corresponding intervals ($c_i$);
   (d-2) randomly generating individual new pixels ($x_i^{alat}$) within a range of the individual intervals ($c_i$) returned in step (d-1); and
   (d-3) generating a new image ($X^{alat}$) by allocating the individual new pixels ($x_i^{alat}$), generated in step (d-2), to respective locations of the individual pixels ($x_i$) of the original image (X).

3. The method of claim 1, wherein the activation function used in the step (c) is a softmax function.

4. A method of attack-less adversarial training for robust adversarial defense, comprising the steps of:
   (a) generating individual intervals ($c_i$) by setting a range of color (C) and then discretizing the range of color (C) by a predetermined number (k);
   (b) generating one batch from an original image (X) and training a learning model with the batch;
   (c) predicting individual interval indices ($\hat{y}_i^{alat}$) from respective pixels ($x_i$) of the original image (X) by using an activation function;

(d) generating a new image ($X^{alat}$) through mapping and randomization; and
(e) training a convolutional neural network with the image ($X^{alat}$) generated in step (d) and outputting a predicted label ($\hat{Y}$), wherein the step (d) comprises:
   (d-1) mapping the individual predicted interval indices ($\hat{y}_i^{alat}$) and returning corresponding intervals ($c_i$);
   (d-2) randomly generating individual new pixels ($x_i^{alat}$) within a range of the individual intervals ($c_i$) returned in step (d-1); and
   (d-3) generating a new image ($X^{alat}$) by allocating the individual new pixels ($x_i^{alat}$), generated in step (d-2), to respective locations of the individual pixels ($x_i$) of the original image (X).

5. The method of claim 4, wherein the activation function used in the step (c) is a softmax function.

\* \* \* \* \*